2,983,657

MANUFACTURE OF GRAFTED POLYMERS

Jeannine Gabilly, L'Hay-les-Roses, and Michel Jobard, Paris, France, assignors to Compagnie de Saint-Gobain, Paris, France No Drawing. Filed Mar. 28, 1957, Ser. No. 648,989

Claims priority, application France Apr. 14, 1956

7 Claims. (Cl. 204—154)

This invention relates to an improvement in the manufacture of grafted vinyl polymers as well as to the new products obtained by this process.

It is known that it is possible to prepare grafted polymers by applying ionizing radiations to a polymer impregnated with a vinyl monomer. Examples of ionizing radiation are X-rays, gamma rays, accellerated electrons and neutrons. By choosing the monomer and satisfactory operating conditions it is thus possible to modify the chemical structure and certain physical or mechanical or physco-chemical properties of the polymer; that method has been particularly successful in improving resistance to heat, to chemical agents such as solvents, and to shock. It is known that that process is applicable not only to crude polymers but to finished objects such as moldings and to semi-finished objects such as tubes, plates and films, and to molding powder.

In the case of polyvinyl chloride, particularly, and similarly with other vinyl resins but in differing degrees, the amount of grafting and consequently the improvement in quality in the polymer is limited by the fact that the impregnation itself is limited. If the impregnation be regarded as a dissolving of the monomer in the polymer the solubility is sometimes too limited to achieve a wholly satisfactory change in character. In the case of polyvinyl chloride the grafting is limited by the quantity of vinyl monomer which the polymer is susceptible of absorbing at those temperatures which are practical, that is at temperatures substantially below the boiling point of the monomer and the point at which the polymer is degraded.

The present improvement overcomes the inherent limitations of the process and makes it possible to achieve degrees of grafting on vinyl polymers, particularly on polyvinyl chloride, which were previously impossible, and thus to obtain novel grafted polymers with greater improvements in the properties.

For example, for a polyvinyl chloride having an average molecular weight of 40,000 the limit of impregnation by acrylic nitrile is limited as follows at the temperatures indicated:

33% at 20° C.
50% at 55° C.
62% at 80° C.
75% at 120° C.

Inasmuch as acrylic nitrile boils at 77° C. it is difficult to induce the polymer at ordinary pressure to accept more than 50% of acrylic nitrile, as 55° C. approaches a limit of satisfactory working conditions.

An object of the invention is to make new polymeric compounds having novel and improved properties.

Another object is to develop a method by which the characteristics of vinyl resins, particularly of vinyl chloride, can be varied at will either by the choice in advance of particular grafting steps to be used in manufacture or by modification of the structure of a resin after it has been completed.

Another object is to impart to vinyl resins, particularly vinyl chloride resins, characteristics and properties which they lack or do not have in the desired degree, and to achieve this object by methods that are certain and reproducible.

Another object is to make vinyl grafts upon vinyl resins to an extent that is greater than the ability of the graft monomer to impregnate the vinyl resin at the temperature employed.

Another object is to develop the process of polymerization by irradiation of a monomer with ionizing rays.

Another object of this invention is to prepare graft polymers at given temperatures and pressures with quantities of grafted polymers which are much greater than was previously feasible, for instance, using 55° C. as an example, to include 200% or more of the graft in comparison with the 50% available with prior art methods.

This invention depends upon our discovery that grafted polymers which have been irradiated will accept an additional impregnation of the graft monomer after the previous impregnation has been polymerized and grafted on. The present invention, consequently, generally speaking, involves the impregnation and engrafting of grafted polymers. Thus, if the basic polymer is vinyl chloride and it has been engrafted with the polymer such as acrylic nitrile, the invention contemplates an additional impregnation with a compatible, polymerizable monomer, which may be the same as or different from the original graft, and the polymerization and engrafting of the monomer, by irradiation. This grafting procedure may be repeated many times if desired, in a series of impregnations with monomer and exposures to ionizing radiation.

A grafted polymer, we have discovered, becomes capable of absorbing additional quantities of monomer once the original charge has been engrafted by polymerization and this process may be repeated until the graft far outweights the original polymer. In the case of polyvinyl chloride, the successive charges may be of magnitude similar to the original charge. A new impregnation with vinyl monomer, followed by a new irradiation enables one to increase the quantity of graft and so forth, until one has obtained the percentage of grafting desired in the ultimate product. For example, if a polymer of vinyl chloride is grafted with an accretion of 33% of acrylic nitrile, it can, by successive impregnations and polymerizations, receive grafts to an extent of 200% or more of the weight of the original polyvinyl chloride. Thus, if the original polymer weighed 100 grams one may engraft upon it by this method 200 grams or more of acrylic nitrile polymer.

The number of operations necessary to obtain a desired accretion depends principally from the degree of saturation acceptable to the polymer, which will vary with the monomer employed for impregnation. The degree of polymerization of the original monomer and the temperature at which the impregnation is carried out both affect the quantity of monomer that can be imbibed.

For example, in the light of the acceptance of acrylic nitrile at different temperatures set forth hereinbefore, it is difficult to work at ordinary pressure with acrylic nitrile and polyvinyl chloride above 55° C. which limits each operation to an accretion of about 50%. This also is true for subsequent impregnations, so that to add 200% of acrylic nitrile, four impregnations and graft polymerizations are necessary, at 55° C. and ordinary pressure. At 20°C. six successive operations are necessary.

If one uses other temperatures, and pressures superior to atmospheric, a larger impregnation is secured and the number of successive operations which are necessary to obtain a selective engraftation is reduced.

We have also discovered that the time necessary to obtain a new saturation by a given vinyl monomer varies according to the amount of grafting already embodied in the polymer. For polyvinyl chloride 8 hrs. suffices to saturate with acrylic nitrile, but it requires 12 hrs. if it contains 50% of graft and 30 hrs. if it contains 100% of graft. The time required for saturation is also related to the temperature, both grafted and ungrafted polymers absorbing more monomer at elevated than at lower temperature. Thus, after 8 hrs. two identical test pieces of polyvinyl chloride absorb respectively 7.5% of acrylic nitrile at 20° C. and 45% at 50° C. It thus follows that it is advantageous to use higher temperatures during impregnation.

As engraftation increases one observes a progressive improvement in the general property of the polymer. This is easy to observe when the process is applied to finished or semi-finished articles, particularly to plates of polyvinyl chloride from which it is easy to take test pieces. We have established that the modulus of rigidity of the vinyl chloride polymers increases as the acrylic nitrile grafts are added. The modulus of rigidity for polyvinyl chloride at 100° C. is .1 kgm. per mm.$^2$ which increases when engrafted with 33% acrylic nitrile polymer to 2.2 kgms. per mm.$^2$, and to 3.2 kgms. per mm.$^2$ when 50% of acrylic nitrile polymers are engrafted and to 7 kgms. per mm.$^2$ when 100% of acrylic nitrile polymers are engrafted.

In order to produce an extensive class of grafted polymers of vinyl chloride, we have selected particular graft monomers to produce particular improvements and we have used together or successively several different monomers, all in accordance with the procedure outlined above. Among the monomers which have been found very useful are those which have substantial solubility in the polyvinyl chloride. Thus, butadiene and isoprene are accepted by polyvinyl chloride only in small quantities (12% and 6% respectively at 55° C.) while acrylic nitrile and methyl methacrylate are accepted by polyvinyl chloride at 20° in 33% and 120%, respectively, thus being preferred because of their greater availability and the relative simplicity of the process of using them. Styrene and vinyl acetate at 50° C. are absorbed 121% and 61%, respectively. The grafted polymers produced by engrafting any of the six illustrative monomers of various type hereinabove mentioned upon polyvinyl chloride are new compounds of value. The same is true for all vinyl monomers which are sufficiently compatible with vinyl chloride to be imbibed, dissolved in, or to serve as an impregnant for it. The process is applicable to polyvinyl chloride in all its forms where resin, powder, molding powders, finished objects, tubes, fibers, and in fact wherever it is possible to impregnate and irradiate the object.

In the case of powder, it is simple by agitation to assure a good separation of the powder at the moment of grafting in order to avoid the formation of crusts.

The process can also be carried out by adding a vinyl monomer to polyvinyl chloride by means of a solvent or other liquid capable of being removed after the grafting. Similarly one may dissolve colors, light stabilizers, heat stabilizers in the vinyl monomer at any stage of the process either before the grafting begins or at any intermediate stage or after the grafting is completed.

*Example*

A strip of polyvinyl chloride 2 x 5 x 70 mm. was weighed and submerged in freshly distilled acrylic nitrile and the whole was maintained at 55° C. in a thermostatically controlled receptacle. Saturation was completed in 8 hrs. The test piece was uniformly enlarged in all diameters and its volume was increased 1/3. The test piece was dried and sealed in an ampule after complete scavenging of the air. The test piece had absorbed 44.5% of the nitrile, the sealed ampule was subjected to the radiation of radio cobalt at a distance of 15 cm. from a source of 70 curies, the emission being about 4,000 roentgens per hour. The total radiation being about 156,000 roentgens. The ampule was broken and the grafted polymer removed. It had not varied substantially in weight. There was thus grafted upon the polyvinyl chloride 44.5% of acrylic nitrile. The operation was repeated by saturating the grafted polymer with acrylic nitrile and by a repeated exposure to the radio cobalt. The time necessary for saturation was 20 hrs. at 55° C. and the irradiation was 185,000 roentgens. This increased the graft content to 91%.

In a third engraftation 45% of monomer was absorbed by the twice grafted product and a radiation of 164,000 was applied, producing a product having 136% of engrafted acrylic nitrile polymer.

A fourth impregnation and engraftation with an irradiation of 156,000 roentgens raised the percentage to 178%. Finally by prolonging the duration of contact between the grafted piece and acrylic nitrile an additional 34% was absorbed and polymerization by irradiation with 164,000 roentgens, producing a graft content of 212%.

During the first grafting a slightly yellow cast was developed in the test piece but did not increase during the subsequent grafting.

The mechanical characteristics of the test piece varied according to the graft content. In particular the modulus of rigidity measured by the method of Clash and Berg was elevated progressively: from polyvinyl chloride at .1 kgm. per mm.$^2$ at 100° C., after the first grafting (44.5%) it increased to 2.9 kgms. per mm.$^2$; after the second grafting (91%) it rose to 6 kgms. per mm.$^2$. The modulus of rigidity on the 212% grafted polymer was 15 kgms. per mm.$^2$ at 100° C.

Among the advantages of the invention are these that the objects of the invention have been attained, that the industry has been provided with a large number of new and valuable products having qualities which were previously unattainable and which may now be attained at will, that a satisfactory method of producing novel products and of varying and improving the qualities of known vinyl polymers has been developed. In particular, this method when employed upon the polymers of vinyl chloride produces new products of improved properties. Among these new and useful products of this invention are polyvinyl chloride engrafted with acrylic nitrile, which is outstanding, polyvinyl chloride engrafted with methyl methacrylate, polyvinyl chloride engrafted with styrene, polyvinyl chloride engrafted with vinyl acetate, polyvinyl chloride engrafted with butadiene, and polyvinyl chloride engrafted with isoprene. Even in the case of compounds such as isoprene and butadiene which are absorbed relatively little, the products are interesting and of novel properties, the novelty of which increases as the content of graft increases.

As many apparently widely different embodiments of the present invention may be made without departing from the spirit and scope thereof, it is to be understood that the invention is not limited to the specific embodiments.

What is claimed is:

1. The method of making grafted polymers that comprises impregnating polyvinyl chloride with a polymerizable monomer containing ethylenic unsaturated bonds and irradiating the impregnated mass with ionizing radiation until substantial polymerization is completed, and repeating the impregnation and radiation polymerizations until the total graft is more than can be introduced by a single grafting step.

2. The method of making grafted polymers that comprises substantially fully impregnating polyvinyl chloride with a polymerization vinyl monomer and irradiating the impregnated mass with ionizing radiation until the grafting is about completed, impregnating the so formed grafted polymer with another portion of the same monomer and irradiating the impregnated mass with ionizing radiation until additional grafting occurs, and the total graft is more than can be introduced by a single grafting step.

3. The method of making grafted polymers that comprises impregnating polyvinyl chloride with a substantial amount of acrylic nitrile monomer and irradiating the impregnated mass with ionizing radiation until substantial grafting is completed, impregnating the so formed grafted polymer with a monomer having a polymerizable vinyl group, and irradiating the impregnated mass with ionizing radiation until additional grafting occurs and the total graft is more than can be introduced by a single grafting step.

4. The method of making grafted polymers that comprises impregnating polyvinyl chloride with a polymerizable vinyl compound repeatedly, and irradiating the impregnated mass with ionizing radiation after each impregnation until a plurality of substantial graftings has occurred and the total of all grafts is greater than can be introduced by a single grafting step.

5. The method of making grafted polymers that comprises impregnating polyvinyl chloride with a polymerizable vinyl monomer and irradiating the impregnated mass with ionizing radiation until substantial grafting occurs, impregnating the so formed grafted polymer with another portion of another polymerizable vinyl monomer and irradiating the impregnated mass with ionizing radiation until additional grafting occurs and the total graft is more than can be introduced by a single grafting step.

6. The method of making grafted polymers that comprises impregnating polyvinyl chloride with acrylic nitrile monomer repeatedly, and irradiating the impregnated mass with ionizing radiation after each impregnation until substantial grafting has occurred, and continuing the impregnations and irradiations until the total graft is more than can be introduced in a single grafting step.

7. The method of making a grafted polymer that comprises impregnating polyvinyl chloride with a polymerizable monomer containing ethylenic unsaturated bonds and irradiating the impregnated mass with ionizing radiation until substantial grafting occurs, thereby engrafting the polymerized monomer upon the polyvinyl chloride, impregnating the so formed grafted product with a polymerizable monomer containing unsaturated ethylenic bonds at least once, and irradiating the impregnated mass with ionizing radiation thereby engrafting an additional polymer upon the engrafted polymer, the series of impregnations and irradiations being continued until the polymer contains more graft than can be introduced in a single grafting operation.

References Cited in the file of this patent

UNITED STATES PATENTS

| | | |
|---|---|---|
| 2,661,331 | Howard | Dec. 1, 1953 |
| 2,666,025 | Nozaki | Jan. 12, 1954 |
| 2,763,631 | Coover et al. | Sept. 18, 1956 |
| 2,798,061 | Coover et al. | July 2, 1957 |

OTHER REFERENCES

Brookhaven National Laboratory Report, No. 367, February 1956, pp. 27 and 28.